(12) United States Patent
Medlen et al.

(10) Patent No.: US 8,876,217 B1
(45) Date of Patent: Nov. 4, 2014

(54) COVER ASSEMBLY FOR OPEN TOP CONTAINER

(71) Applicants: Carlos D. Medlen, Quitman, AR (US); Christy D. Wilson, Quitman, AR (US)

(72) Inventors: Carlos D. Medlen, Quitman, AR (US); Christy D. Wilson, Quitman, AR (US)

( * ) Notice: Subject to any disclaimer, the term of this patent is extended or adjusted under 35 U.S.C. 154(b) by 0 days.

(21) Appl. No.: 13/745,050

(22) Filed: Jan. 18, 2013

Related U.S. Application Data

(63) Continuation-in-part of application No. 12/980,031, filed on Dec. 28, 2010, now abandoned.

(60) Provisional application No. 61/284,887, filed on Dec. 28, 2009, provisional application No. 61/339,268, filed on Mar. 2, 2010.

(51) Int. Cl.
  *B60P 1/26* (2006.01)
  *B60P 1/16* (2006.01)

(52) U.S. Cl.
  CPC ...................................... *B60P 1/162* (2013.01)
  USPC .................... 298/23 R; 298/23 C; 296/100.1

(58) Field of Classification Search
  USPC .. 298/17 R, 22 R, 23 R, 23 MD, 23 M, 23 C; 296/100.1, 100.06; 49/339, 356
  See application file for complete search history.

(56) References Cited

U.S. PATENT DOCUMENTS

| | | |
|---|---|---|
| 3,913,969 A | 10/1975 | Hoch |
| 4,200,330 A | 4/1980 | Scott |
| 4,585,267 A | 4/1986 | Friesen |
| 4,627,658 A | 12/1986 | Vold et al. |
| 5,064,240 A | 11/1991 | Kuss et al. |
| 5,190,341 A | 3/1993 | Simard |
| 5,193,878 A | 3/1993 | Weaver |
| 5,366,052 A | 11/1994 | Keh-Lin |
| 5,498,066 A * | 3/1996 | Cuthbertson et al. ....... 298/23 C |
| 5,542,734 A | 8/1996 | Burchett et al. |
| 6,688,835 B1 | 2/2004 | Buher |
| 6,938,960 B1 | 9/2005 | Eby |
| 7,789,256 B2 | 9/2010 | Petzitillo, Jr. et al. |
| 2005/0127705 A1 | 6/2005 | Morrow |
| 2006/0043755 A1 | 3/2006 | Coughtry |
| 2006/0113820 A1 | 6/2006 | Morrow |

\* cited by examiner

*Primary Examiner* — Stephen Gordon
(74) *Attorney, Agent, or Firm* — Joe D. Calhoun

(57) ABSTRACT

The invention generally relates to a mobile leak-proof container structured to contain a load after any rollover. The invention provides a safer way to transport loads and minimizes the risk of an environmental spill or leak when hauling waste generated by the oil and gas industry. The container, such as a dump truck bed or a dump body, includes a central leak-proof top-loading door; a rear tailgate for dumping the contents from the rear of the container; recessed framework having upper margins of the container walls and a door-jamb that define a reservoir; and a plurality of brace members for supporting the frame against the walls of the container. It also includes one or more corner panels covering the brace members and for preventing the loading of any load near the juncture of the roof framework and each respective adjoining side wall.

16 Claims, 8 Drawing Sheets

COVER ASSEMBLY FOR OPEN TOP CONTAINER

CROSS-REFERENCE TO RELATED APPLICATIONS

This application is a continuation-in-part of U.S. Utility patent application Ser. No. 12/980,031 filed Dec. 28, 2010, now abandoned, which claims the benefit of U.S. Provisional Application No. 61/284,887, filed Dec. 28, 2009, and U.S. Provisional Application No. 61,339,268 filed Mar. 2, 2010, wherein all of the U.S. priority applications are herein incorporated by reference.

FEDERALLY SPONSORED RESEARCH AND DEVELOPMENT

Not applicable.

BACKGROUND OF THE INVENTION (1) Field of the Invention

The invention generally relates to a cover assembly for an open-top container, for preventing the inadvertent rollover of the container and/or preventing load leakage after a rollover.

(2) Description of Related Art Including Information Disclosed 37 CFR 1.97 and 1.98

Various types of enclosed and covered containers are used to cover a container's load, including covers and tarps. Most covers are made from a foldable or collapsible type material, and are used to cover the load contents to keep the contents from escaping, blowing away, or falling from the container during transport. Contents falling from the container during transport can create a hazard to other motorists. In the context of the oil and gas industry, the contents may include particles, wet or dry drill cuttings, and centrifuge waste generated during the drilling process.

Several options attempt to keep the load contained within the enclosed reservoir, but fail to meet the needs of the industry because the load is not contained in the event of a rollover. Also, these options fail to keep particles from blowing into the environment (or debris into the container) during transport. Another option for containing the load involves using metal roll-off boxes having chains and binders; however, this option is similarly ineffective because the box is not strong enough to contain the product during a rollover. Other options attempt to keep a load having fluid or semi-fluid contents from splashing over the top sides of the container during transport, but these are also ineffective because the materials used are not leak proof and are not strong or durable enough. Also, many roll-off boxes are not attached to the frame of a vehicle. Other options include a rigid cover that covers the top of the container. As the load fills the container, the container is at risk for rolling or tipping over. Many of the options providing a rigid cover lack the structural support needed to decrease the chances of the container rolling over.

A need exists for a leak proof composition or material for fully enclosing a dump body or container, where the dump body that is permanently attached to a truck or trailer frame, to transport the contents without spillage. A need exists for a fully enclosed dump body that would minimize the risk of an environmental spill in the event of a rollover accident. A need also exists for a gauge that aids the user in determining the amount or level of contents in the container. A need exists for a fully enclosed dump body to transport any type of product that is generally transported in a similar fashion as that of a regular dump body. A need also exists for the dump body to have a telescopic catwalk with a handrail, and a foldable ladder for reaching the top of the container. A need also exists for accessing the container after a rollover with a man-way hatch.

UK Patent No. GB 2,317,595, filed by Hoyne et al. (published on Jan. 4, 1998) discloses an open-top load container having: (1) a rigid cover hingedly mounted on the container's side walls, and movable between open and closed positions; (2) a sealing means between the side walls and the cover to prevent ingress of water and moisture when the cover is in its closed position; (3) a hydraulic power means for operating the cover; and (4) a rear discharge door, pivotable about its upper edge and movable outwardly from the container when the container is tipped. The sealing means may be a sealing flag mounted along the upper edge of the side walls and/or around the peripheral edge of the inside face of the cover. The rear door also includes a seal. It also discloses a cover locking means having a locking bolt and a complementary receiver for releasably locking the cover in the closed position, with one part mounted on the cover and the other part mounted on the container side wall. The bolt may be a ram operated, and connected to a hydraulic power supply for operation.

U.S. Pat. No. 4,200,330 issued to Scott discloses a hinged cover attachable to existing open top containers, with the cover having a lightweight supporting frame, and an actuating means connected to and operated by a vehicle's electrical system for raising or lowering the cover. It discloses a platform area (or deck) along one side of the supporting frame, with the cover pivotally connected to the platform with hinges. It also discloses that overlying the deck and surrounding support rails is a sealing member that prevents loss of the contents. A linear actuator is secured to the deck, and has a shaft coupled to the cover.

U.S. Pat. No. 5,190,341 issued to Simard discloses a rigid cover assembly for an open top container, wherein the cover assembly has a hinged, arched shaped lid with tilted piston devices for pivoting the cover assembly over the container. A resilient seal member is secured to the lower edge of the frame and extends over all the peripheral walls of the container so as to completely seal the inner space of the container under the cover. A pair of sealing strips is mounted between the cover and the core of a module to exclude infiltration inside the container when the cover is closed. It discloses that the cover is pulled upwardly by the piston acting on a lever pivoting about a reinforced portion of the lid.

U.S. Pat. No. 5,064,240 issued to Kuss et al. discloses a rigid arching displacement cover for an open-top bed of a truck, including a top portal with an upward-opening hinged covering for receiving or removing material.

BRIEF SUMMARY OF THE INVENTION

Although the present invention has several embodiments, one embodiment is essentially an open-top container for receiving a load, with the container comprising (including or having) upstanding forward (or front) wall and side walls, a rear door (or tailgate), and a frame supporting a roof having an opening for receiving a load; also included are a plurality of brace members affixed to the frame and to the walls, and a top-loading door atop a door-jamb supported by the frame.

In another embodiment, the invention includes an open-top container for receiving a load, with the container including upstanding forward, rear, and side walls; a roof having an opening for receiving a load; a frame for supporting the roof to the walls; a plurality of brace members affixed to the framework and the walls, with the brace members enclosed by one or more corner panels spanning the length of the side walls; and a door. The panels provide added support to the container as it is filled with a load, to aid in preventing the container from rolling over.

In yet another embodiment, the invention includes a cover assembly for an open-top container having a plurality of brace members for supporting a frame against one or more walls of a container, and a cover for covering the opening at the top of the container. One or more panels may also be included for covering the brace members. The various embodiments of the invention provide a safer way to transport loads. In each embodiment, the roof or framework may be recessed and anchored to the walls. The invention minimizes the risk of an environmental spill or leak when hauling the loads.

It is an object of one embodiment of the present invention to provide a plurality of brace members for supporting the roof, frame, and walls of a mobile leak-proof container.

It is another object of the present invention to provide a plurality of brace members for supporting a door jamb and/or frame of a mobile leak-proof container.

It is another object of the invention to provide a mobile leak-proof container structured to contain a load after any rollover.

It is yet another object of the invention to provide a mobile leak-proof container that uses a rigid material, such as a door, for fully enclosing the container during transport.

It is another object of the invention to provide a mobile leak-proof container that uses a leak-proof door to prevent spillage of contents.

It is another object of the invention to provide a mobile leak-proof container that includes a telescopic catwalk with a handrail, a foldable ladder, and a plurality of man-way hatches.

It is an object of the invention to provide a mobile leak-proof container that has a gauge for determining the fill-level of the container.

It is an object of the invention to provide a mobile leak-proof container that has vacuum-loading hardware.

It is an object of another embodiment of the present invention to provide a plurality of brace members and at least one panel for preventing the top corners of the container from becoming top heavy, which may lead to the container rolling over.

Other objects will be apparent from a reading of the written description disclosed herein, together with the claims.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

For the sake of simplicity and to give the claims of this patent application the broadest interpretation and construction possible, the following definitions will apply:

The term "container" or "dump body" essentially means a container, body, or structure having a reservoir for receiving and containing a load. Unless otherwise stated, the container refers to one that is enclosed or covered at the top with a rigid cover, top-loading door or other enclosure.

The term "vehicle" essentially means a truck and/or a trailer having a bed for supporting the container.

The term "contents" or "product" essentially means the load substance that fills the reservoir, regardless of whether the substance is a liquid, semi-liquid, or particles.

The term "gasketing" essentially means a sealing means for creating a leak-proof seal between the door (or tailgate) and door-jamb when the door (or tailgate) is closed. It is not limited to solely gaskets, and includes any suitable sealing means for creating a leak-proof seal when the door is closed and seated within the door-jamb.

The term "actuating" essentially means to open or to close an object, such as a door.

Also for the sake of simplicity and to give the claims of this patent application the broadest interpretation and construction possible, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

The invention disclosed herein is not limited by construction materials to the extent that such materials satisfy the structural and/or functional requirements. For example, any material may be used so long as it satisfies the function for which it is being used.

Figure 1:
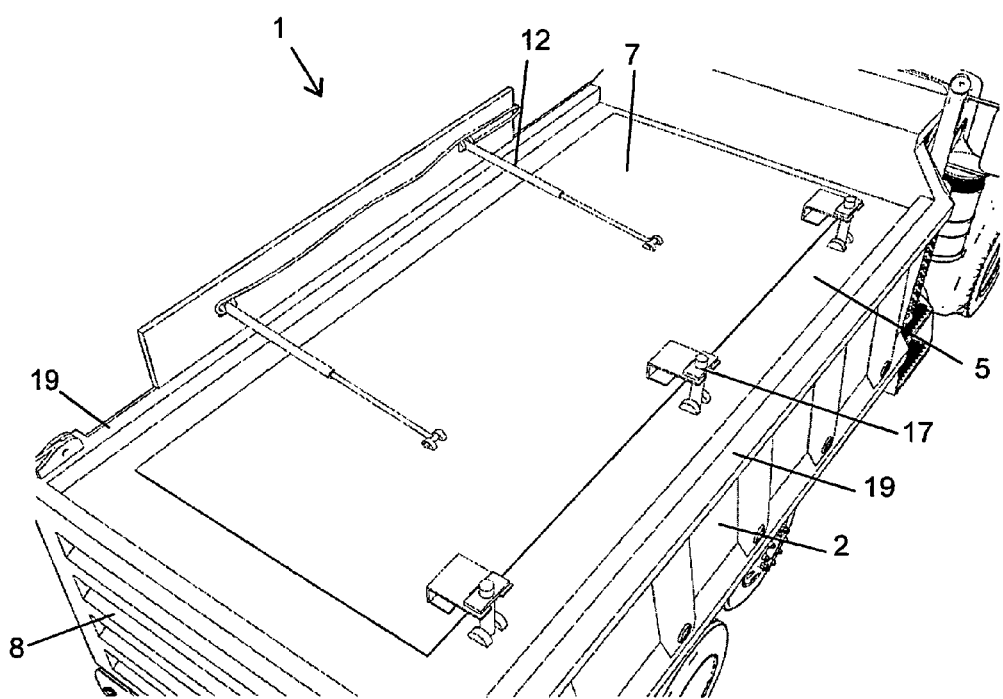
FIG. 1 depicts a top perspective view of one version of the mobile leak-proof container (1), with the top door (7) and rear tailgate (8) closed, but without the telescopic platform, railing, and foldable ladder. Also labeled are one of the two side walls (2), the perimeter panel (5) of the roof framework, a piston-operated actuation means (12), and a representative sample of a door locking means (17).

In one embodiment (FIGS. 1, 2 and 4), the present invention is a mobile leak-proof container structured to contain a load after any rollover, the mobile container comprising (including or having) a dump truck bed including:

(1) two upstanding opposite side walls and an upstanding forward (or front) wall, each having a rearward edge and an uppermost edge atop an upper margin, and an upstanding rear span-wall;

(2) a rigid recessed-roof framework anchored at its outer perimeter to (and within) the side walls, the forward wall and rear span-wall, below the respective upper margin thereof, with the framework supporting (and including) an upstanding door-jamb frame supporting an essentially central leak-proof door hingedly opening upwardly, with the recessed framework and upper margins and door-jamb defining a reservoir;

(3) a rearwardly opening leak-proof tailgate hingedly mounted at its uppermost edge to the rear span-wall; and (4) a plurality of brace members within the container between the roof framework and each respective adjoining side wall, with each brace member augmenting the structural strength of the container.

Figure 5:
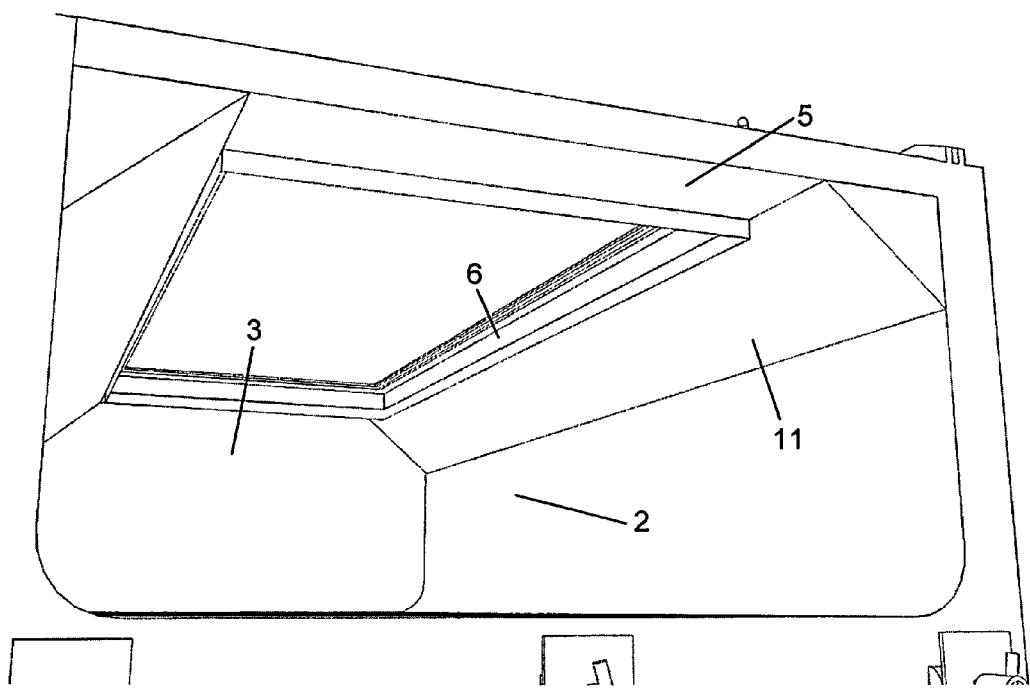
FIG. 5 depicts an interior rear view of another version of the container, with the rear tailgate removed and with a corner panel (11) installed.

This embodiment may further include one or more panels mounted to the brace members (FIG. 5). It may further include the door being lockable, the tailgate being power-actuated and lockable, at least one actuating mechanism for operating one or more doors, and leak-proof sealing (such as gaskets on the door-jamb, door and/or tailgate) to prevent leakout or spillage of the container's content.

In another embodiment, the invention is essentially a mobile leak-proof container structured to contain a load after any rollover, with the mobile container comprising a dump truck bed including:

(a) two upstanding opposite sidewalls and an upstanding forward wall, each having a rearward edge and an uppermost edge atop an upper margin, and an upstanding rear span-wall;

(b) a rigid recessed roof framework having a perimeter anchored within the sidewalls, forward wall and rear span-wall, below the respective upper margin thereof, and including an upstanding door-jamb supporting an essentially central leak-proof door opening, with the recessed framework and upper margins and door-jamb defining a reservoir;

(c) a rearwardly opening leak-proof tailgate hingedly mounted at its uppermost edge to the rear span-wall;

(d) an actuation means for actuating opening and closing of the door, and an energizing means for energizing opening and closing of the tailgate; and (e) a plurality of brace members within the container between the roof framework and each respective adjoining side wall, each such brace member augmenting the structural strength of the container and preventing the loading of any load near the juncture of the roof framework and each respective adjoining side wall, with the container further comprising at least one corner panel for covering the brace members, the panel spanning the length of each of side walls.

In yet another embodiment, the invention is essentially a mobile leak-proof container structured to contain a load after any rollover, the mobile container comprising (1) a fully enclosed metal dump body that is permanently attached to the frame of a truck or trailer; (2) a top-loading hingedly opened door used for loading procedures; (3) a rear door (tailgate) for unloading the contents of the dump body; (4) an actuation means for opening and closing one or more of the doors; and (5) a plurality of brace members within the container between the roof framework and each respective adjoining side wall, each such brace member augmenting the structural strength of the container. In a further version of this embodiment, container further includes one or more corner panels mounted to the brace members.

Another embodiment includes a mobile leak-proof container structured to contain a load after any rollover, said mobile container comprising a dump truck bed enclosure comprising:

(a) an upstanding forward wall and two upstanding opposite side walls, each side wall having a rearward edge, each of said three walls having an uppermost edge atop a respective upper margin;

(b) a rigid recessed roof framework comprising a perimeter panel anchored within the side walls and forward wall, below the respective upper margins thereof, said roof framework further comprising an upstanding rearward margin, said roof framework further comprising a door-jamb supporting a leak-proof door hingedly opening upwardly, said perimeter panel and four upper margins and door-jamb defining a reservoir;

(c) a rearwardly opening leak-proof tailgate hingedly mounted at its uppermost edge to said roof framework or said rearward edge of said side walls; and (d) a plurality of brace members within the container between the perimeter panel and each respective side wall, each brace member augmenting the structural strength of the container.

In said mobile leak-proof container, said actuation means may include a first hydraulic piston-cylinder having its cylinder end connected to the upper margin of an upstanding wall and the exposed piston-rod end connected to the outward door surface.

Yet another embodiment includes a cover assembly for retrofitting or improving a mobile, open-top load container having an upstanding forward wall and two upstanding opposite side walls having a rearward edge, each of said three walls having an uppermost edge atop a respective upper margin; said cover assembly may include:

(a) a rigid recessed roof framework comprising a perimeter panel anchored within the side walls and forward wall, below the respective upper margins thereof, said roof framework further comprising an upstanding rearward margin and a door-jamb supporting a leak-proof door hingedly opening upwardly, said perimeter panel and four upper margins and door-jamb defining a spillage reservoir; and (b) a plurality of brace members within the container between the perimeter panel and each respective side wall, each brace member augmenting the structural strength of the container.

In said embodiment, the cover assembly may further include one or more corner panels enclosing the brace members and spanning the interior length of the container, said corner panels preventing the loading of any load near the corner juncture of the perimeter panel and each respective side wall.

Each embodiment of the invention may further include a locking means for locking the door and/or the tailgate; a gauge, such as a sight glass to determine the load capacity; and waterproof seals to provide leak proof transport. The container may be a rectangular-shaped or square-shaped box fabricated to a user's desired needs and dimensions. One primary use of the invention is to fully enclose a load, preferably a liquid load, in a leak proof container sufficiently structured to contain the load if the vehicle rolls over, while allowing relatively easy loading and unloading. The container may be affixed to the vehicle frame to keep the container from falling off during transport.

Figure 4:
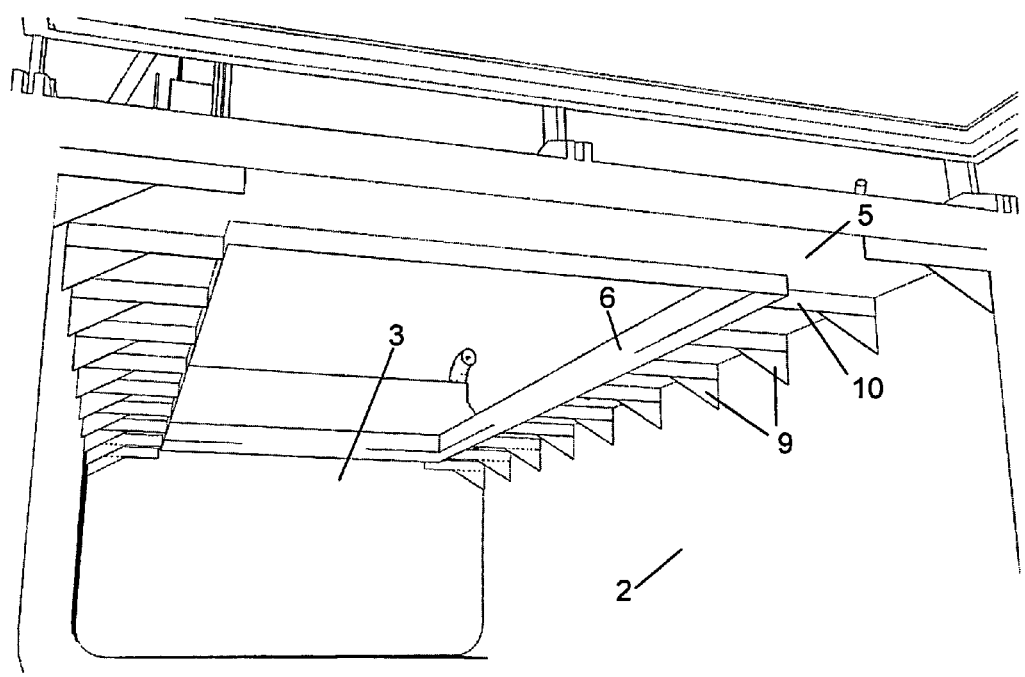
FIG. 4 depicts an interior rear view of the container with the rear tailgate opened rearwardly, showing a plurality of brace members (9) and the forward wall (3). Also labeled are support posts (10), and the interior of the door-jamb (6) and one of the side walls (2), and the underside of the perimeter panel (5).

Various brace members, bracing, brackets and/or frame supports may be located within the container between the roof framework and each respective adjoining side wall, with each such brace member augmenting the structural strength of the container and preventing the loading of any load near the juncture of the roof framework and each respective adjoining side wall. The brace members are spaced apart along the length of side walls. The cover assembly includes a framework (or frame) within the top of the container opening having brace members underneath the frame to secure the frame to the container (FIGS. 4 and 5). In one embodiment, each brace member essentially includes a half truss and a support post. The truss includes a first side affixed to the side wall, a second side affixed to the support post, and a diagonal third side. The support post is essentially a plate or a beam affixed underneath the roof framework, regardless of whether the roof is recessed into the walls.

In another embodiment, the framework further includes at least diagonal one corner panel for covering the third side of the brace members. Preferably two corner panels are used, with one corner panel for each side wall. FIG. 5 depicts the interior rear view of another version of the container, with the rear tailgate removed and the brace members hidden beneath (and supporting) a diagonal corner panel. Each panel spans the length of each side wall. Each corner panel is selected from the group consisting of a continuous panel spanning the length of each of said side walls, one or more segmented panels forming a connected panel and spanning the length of each of said side walls, and combinations thereof. A single continuous, non-segmented panel is preferred. Another benefit of the corner panel would be to prevent loading the contents (or materials) up to the top corners of the container's interior, thereby preventing rollovers. For example, the empty space created under the corner panel and between the side wall and the frame aid in preventing the container from becoming top-heavy.

The roof may be recessed down into all the walls or it may be mounted on top of all the walls. The upstanding opposite side walls and an upstanding forward wall, each have a rearward edge and an uppermost edge atop an upper margin, and an upstanding rear span-wall. The roof framework is preferably recessed and rigid. The roof framework preferably has a perimeter anchored within the side walls, forward wall and rear span-wall, below the respective upper margin thereof. More particularly, the framework is anchored at its outer perimeter to (and within) the upstanding walls of the container (below the top edges of the walls). Alternatively, the roof framework may be anchored on top of the side walls, forward wall (and any rear span-wall if necessary), provided that the roof framework also includes upstanding structure(s) functionally equivalent to the aforementioned margins.

The roof framework may also include an upstanding door-jamb supporting an essentially central leak-proof door hingedly opening upwardly. The recessed-roof framework is anchored at its outer perimeter to the upstanding walls of the container, while the piston-cylinder is mounted to the upper edge of the upstanding wall of the container. The enclosed metal dump body as well as the doors can be made to any size dimensions. The metal can be of any type and of any thickness or grade depending on the user's needs. The enclosed metal dump body can also be used on trailers and not limited to trucks. More particularly, the framework supports an upstanding door-jamb frame supporting a top-opening door hingedly mounted atop the door-jamb. The door is lockable and preferably actuated by power, preferably by hydraulic piston-cylinders. The recessed framework and upper margins and door-jamb define a reservoir. A rearwardly opening leak-proof tailgate may be hingedly mounted at its uppermost edge to the rear span-wall. The tailgate may be rigid, lockable, and power-actuated. The leak-proof door, the door-jamb, and the tailgate may each include gasketing. The leak-proof sealing, preferably gaskets or gasketing, prevents leakout or spillage of the container's content. Additional elements may also include a gauge indicating the fill-level of the container, and storage space for storing equipment.

Figure 2:
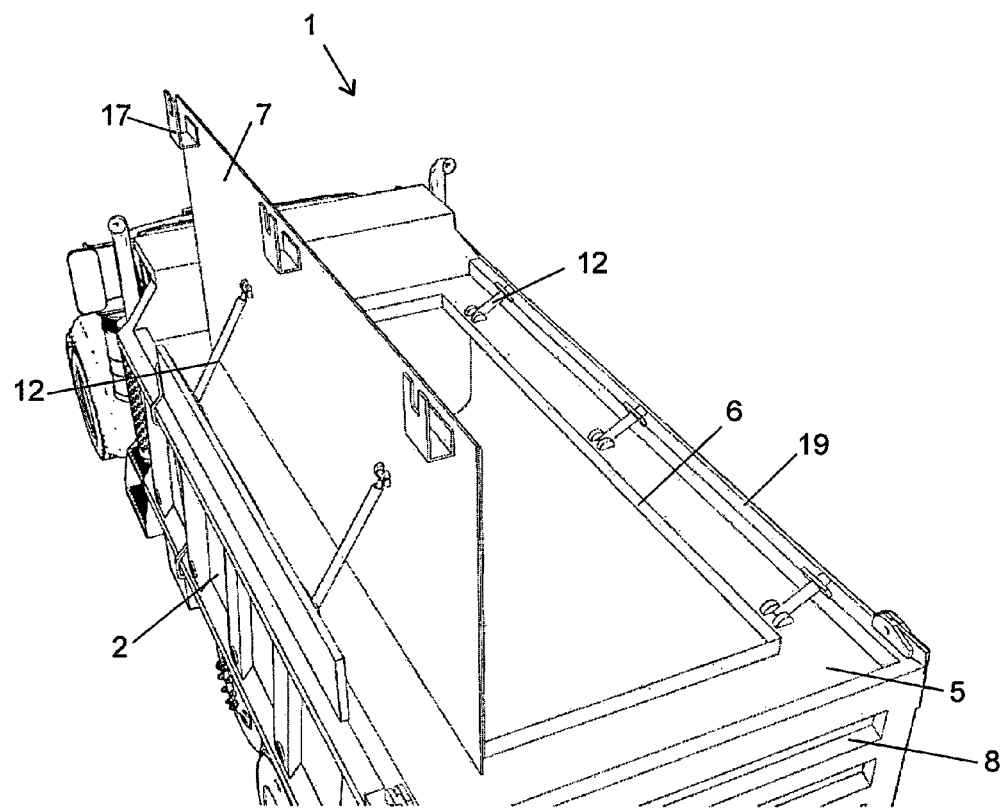
FIG. 2 depicts a perspective view of FIG. 1 thereof, with the door opened. Also labeled is the door-jamb (6).
Figure 3:
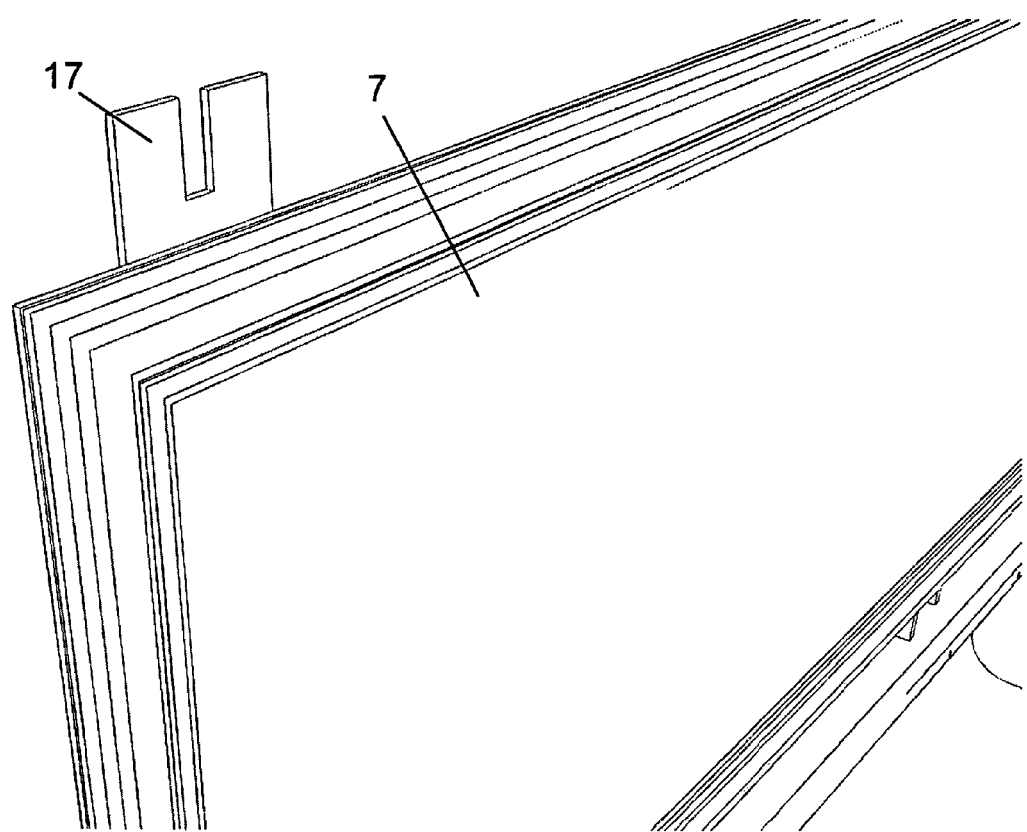
FIG. 3 depicts a close-up view of one version of the door seal.
Figure 8:
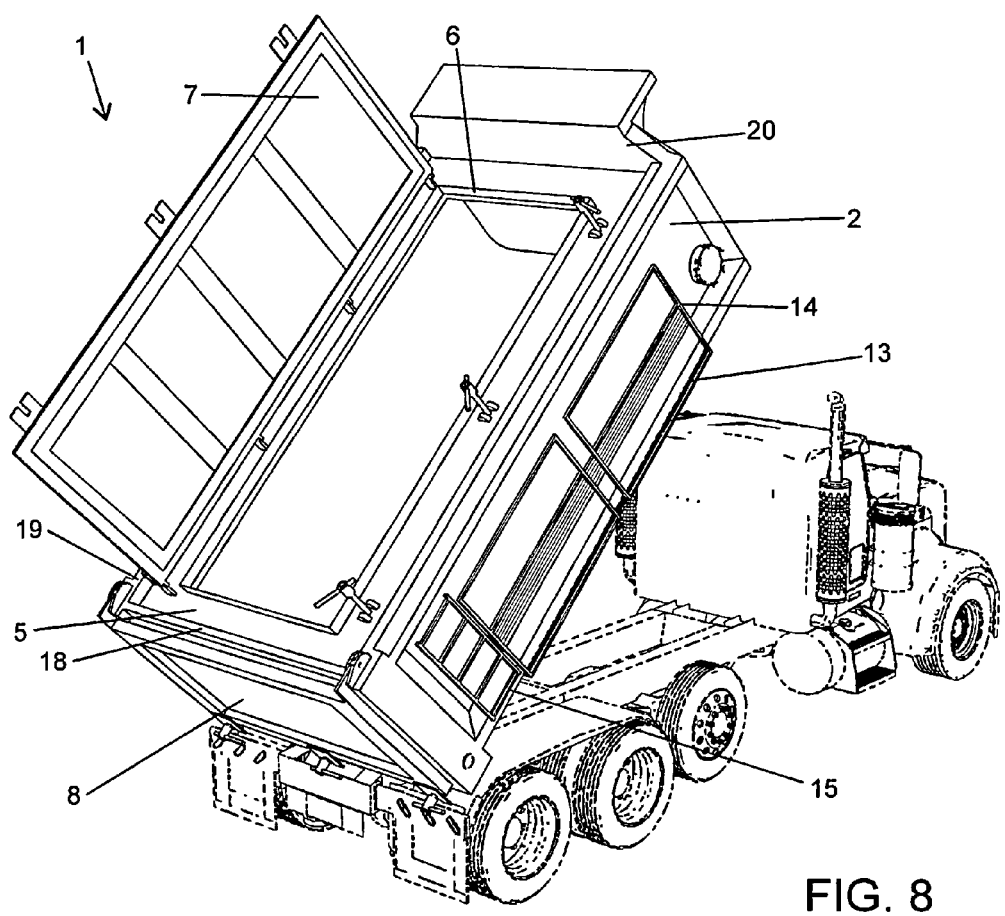
FIG. 8 depicts a distant rear perspective view of another embodiment of the invention container, with the container (or bed) raised and the door opened; also labeled are the rearward margin (18), side margin (19) and forward margin (20).

A door frame, a door-jamb and leak proof seals may be associated with the door. Load locks secure the door when closed (FIG. 3). As depicted in FIG. 2, when the door is opened, the user may fill the container following loading procedures, typically with heavy equipment such as track hoes, front end loaders or conveyors. The door may be a flat metal enclosure attached to the top of the dump body side walls, and is not foldable or flexible like a tarp. The door may be hingedly opened, with the door upstanding when opened, or slidably opened. FIG. 8 depicts the door in the upright, open position, with the bed raised.

Hingedly mounted atop the door jamb upstanding from the framework is a rigid upward-opening door, having a plurality of locking means such as latches. Since the framework is recessed below the uppermost edge of the container walls, the uppermost walls support a means for actuating the door, such as at least one hydraulic piston-cylinder, with the cylinder end mounted to the upstanding wall and the exposed piston-rod end mounted to the door. The door is elevated above the recessed framework, which provides a catch basin or reservoir for any load material that spilled during the loading process. The door elevation allows the door lock(s) to function above the reservoir level to avoid any hindrance from any spilled load in the reservoir.

A door-jamb may be fabricated to fit the dimensions of the hinged metal framed door, depending on the user's loading needs. In one embodiment, the door may be a rectangular sheet of fabricated metal since most dump bodies are rectangular in shape, even though each has a different dimension. The metal may be a sheet of heavy gauge flat metal. The flat metal sheet may be cut and molded to satisfy any size and dimensional specifications to customize the fit to the top opening of any size dump body. The door may be framed with angle iron with heavy duty hinges attached to the desired side of the door and jamb. The door can be attached to the top opening of the dump body usually by welding or bolting the door to the walls of the top opening of the dump body. Support brackets are welded to the edges of the bottom side of the door for attachment to the inside walls of the dump body at the time of installation. The braces hold and give support to the door when attached to the dump body. The door hinges may be attached to any side wall for opening the door to an upright position from the left or right side of the side walls. A safety latch secures the door when in the flat and closed position. Once installed, the entire dump body is enclosed by metal when the door is closed.

The door (and door-jamb) may be lined with an oil and water resistant seal to minimize the risk of leaks during transport or during a rollover. In one embodiment, high compaction rubber seals line the bottom edges of the door to provide a leak tight seal whenever the door is closed and seated in the door-jamb. Thus, when closed, the door will align with a door-jamb and press against the seals to become leak tight. To operate the door, an actuation means may be used for actuating opening or closing the door. The actuation means is selected from the group consisting of hydraulic piston-cylinder systems, pneumatic systems, cable systems and combinations thereof. In one embodiment, at least one hydraulic cylinder and a hydraulic pump may be used to raise the door to an upright position or to lower the door. In addition to the hydraulic cylinder and hydraulic pump, a hydraulic hose, a hydraulic fluid tank and a battery may also be used to open and close the top door. A plurality of hydraulic cylinders may be mounted to the upstanding wall and powered by the hydraulic pump and exposed piston-rod mounted to the door. The hydraulic pump can be placed in another location to meet the user's desires or needs. Furthermore, the door may be opened from either side, so that when the door is open in an upright position, it is parallel with either side wall of the dump body.

In another embodiment, the invention includes a container having (1) a sliding top-loading door that retracts using a sliding mechanism, such as one using guides and/or tracks; (2) a sliding top-loading door; (3) a lighter or heavier gauge metal sheet and support brackets to cover and support the enclosure to the dump body; (4) a bolt and nut application system that allows for the metal enclosure to be attached and detached more easily; (5) a safety latch that locks the loading door into place; and (6) a declining pitch/slop in the flat metal sheet to allow spills to flow toward opening during loading procedures.

The container also includes a tailgate hingedly mounted at its upper edge to the rearmost upper edge of the container, allowing the lower edge of the tailgate to open rearwardly for dumping loads. To eject the load, the vehicle bed is raised and the tailgate door opened. The tailgate may also have additional hinging along its side edge, allowing the tailgate to swing open rearwardly like a standard door. The tailgate also includes a plurality of locking means such as latches, power actuation, and gasketing for leak-proof sealing the container during transport or during a rollover. To operate the tailgate, an energizing means may be used for energizing opening and closing of the tailgate. In another embodiment, the door may be slidably opened with a sliding mechanism, rather than hingedly opened as previously described.

Figure 6:
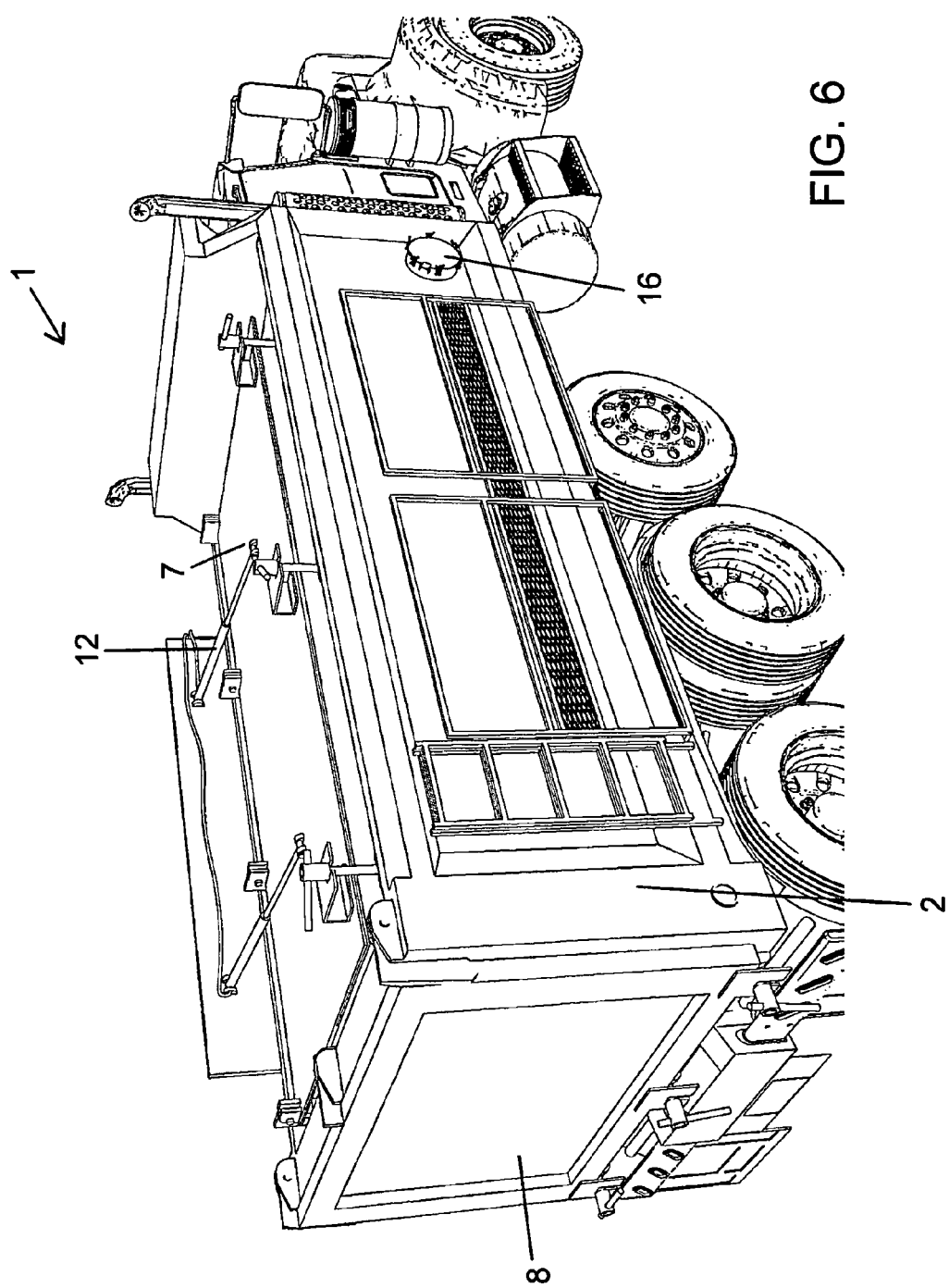
FIG. 6 depicts a perspective view of the container, with the telescopic platform and hand railing in a retracted state.
Figure 7:
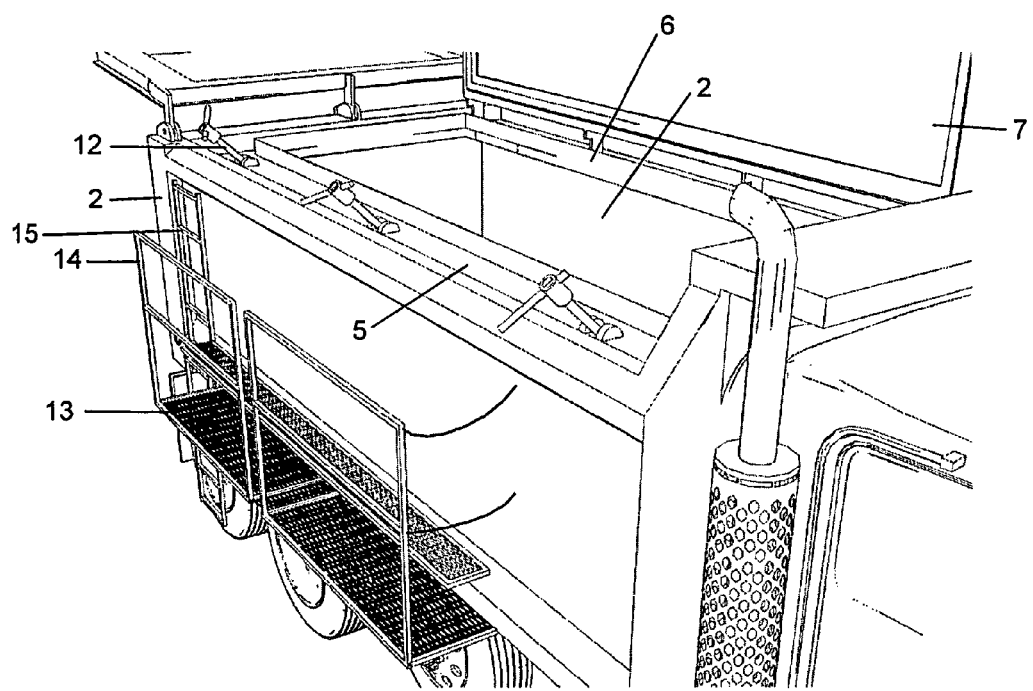
FIG. 7 depicts a perspective view of FIG. 6 thereof, with the telescopic platform (13) and railing (14) extended, and the door open. Also labeled are the ladder (15) and manway hatch (16).

Each embodiment of the invention may further include at least one telescopic catwalk mounted to at least one of the side walls, or it may be retractable underneath the side wall. FIGS. 6 and 8 depict the catwalk in its retracted state, while FIG. 7 depicts the catwalk in its extended state to allow a user to walk next to the sidewall of the container. The catwalk further includes a handrail for user support and safety. The foldable ladder may be in its un-folded state (not shown) where it can be accessed from the ground or from the catwalk for a user to reach the top of the container. The ladder may be located adjacent to the catwalk for easy access to the top of the container, and may extend downwardly along the side wall for access from the ground. A plurality of man-way hatches is also included for use after a rollover accident.

The invention is superior when compared to other known devices because the present invention will contain the product inside the dump body in the event of a rollover to minimize the risk of an environmental spill, to keep contents from falling over the sides while travelling on highways, and to keep the loaded contents from becoming wet and free of unwanted debris.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

We claim:

1. A mobile leak-proof container structured to contain a load after any rollover, said mobile container comprising a dump truck bed enclosure comprising:
   (a) an upstanding forward wall and two upstanding opposite sidewalls, each side wall having a rearward edge, each of said three walls having an uppermost edge atop a respective upper margin;
   (b) a rigid recessed roof framework comprising a perimeter panel anchored within the sidewalls and forward wall, below the respective upper margins thereof, said roof framework further comprising an upstanding rearward margin, said roof framework further comprising a door-jamb supporting a leak-proof door hingedly opening upwardly, said perimeter panel and four margins and door-jamb defining a reservoir;
   (c) a rearwardly opening leak-proof tailgate hingedly mounted at an uppermost edge to said roof framework or said rearward edge of said side walls; and
   (d) a plurality of brace members within the container between the perimeter panel and each respective side wall, each brace member augmenting the structural strength of the container.

2. The mobile leak-proof container described in claim 1, each of said brace members comprising a first side affixed to one of said side walls, and a second side affixed to said perimeter panel.

3. The mobile leak-proof container described in claim 2, the container further comprising at least one corner panel covering a plurality of said brace members for preventing the loading of any load near an interior juncture of the perimeter panel and the respective side wall between said brace members.

4. The mobile leak-proof container described in claim 3, said corner panel covering all of said brace members and spanning the length of the interior of the container.

5. The mobile leak-proof container described in claim 4, wherein the container comprises corner paneling on each interior side of the container.

6. The mobile leak-proof container described in claim 1, further comprising door or door-jamb gasketing.

7. The mobile leak-proof container described in claim 1, said leak-proof tailgate comprising tailgate gasketing.

8. The mobile leak-proof container described in claim 1, said leak-proof door further comprising locking means for locking said door.

9. The mobile leak-proof container described in claim 1, said leak-proof tailgate further comprising locking means for locking said tailgate.

10. The mobile leak-proof container described in claim 1, further comprising an actuation means for actuating opening and closing of the door, and an energizing means for energizing opening and closing of the tailgate.

11. The mobile leak-proof container described in claim 10, said actuation means selected from the group consisting of hydraulic piston-cylinder systems, pneumatic system, cable systems or combinations thereof.

12. The mobile leak-proof container described in claim 11, said actuation means comprising a first hydraulic piston-cylinder having a cylinder end connected to an upper margin of an upstanding wall and an exposed piston-rod end connected to an outward door surface.

13. The mobile leak-proof container described in claim 1, further comprising a gauge means for determining a fill level within the container.

14. The mobile leak-proof container described in claim 1, said door-jamb and door define a track means facilitating the slidable opening and closing of said door.

15. A mobile leak-proof container structured to contain a load after any rollover, said mobile container comprising a dump truck bed enclosure comprising:
   (a) an upstanding forward wall and two upstanding opposite sidewalls, each side wall having a rearward edge, each of said three walls having an uppermost edge atop a respective upper margin;
   (b) a rigid recessed roof framework comprising a perimeter panel anchored within the side walls and forward wall, below the respective upper margins thereof, said roof framework further comprising an upstanding rearward margin, said roof framework further comprising a door-jamb supporting a leak-proof door hingedly opening upwardly, said perimeter panel and four margins and door-jamb defining a reservoir;

(c) a rearwardly opening leak-proof tailgate hingedly mounted at an uppermost edge to said roof framework or said rearward edge of said side walls; and
(d) a plurality of brace members within the container and positioned between the perimeter panel and each respective side wall, each brace member augmenting the structural strength of the container.

16. The mobile leak-proof container described in claim 15, further comprising actuation means comprising a first hydraulic piston-cylinder having a cylinder end connected to an upper margin of an upstanding wall and an exposed piston-rod end connected to an outward door surface.

\* \* \* \* \*